United States Patent
Okuda

(10) Patent No.: US 9,063,404 B2
(45) Date of Patent: Jun. 23, 2015

(54) LASER LIGHT SOURCE AND PROJECTION DEVICE HAVING FIRST AND SECOND REFRACTIVE PARALLELIZING ELEMENTS

(71) Applicant: SANYO ELECTRIC CO., LTD., Osaka (JP)

(72) Inventor: Michihiro Okuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 266 days.

(21) Appl. No.: 13/724,378

(22) Filed: Dec. 21, 2012

(65) Prior Publication Data

US 2013/0162956 A1    Jun. 27, 2013

(30) Foreign Application Priority Data

Dec. 21, 2011    (JP) .................. 2011-279814

(51) Int. Cl.
| | |
|---|---|
| G03B 21/20 | (2006.01) |
| H04N 9/31 | (2006.01) |
| G02B 19/00 | (2006.01) |
| F21V 13/04 | (2006.01) |
| G03B 33/12 | (2006.01) |
| G02B 27/09 | (2006.01) |
| G02B 27/10 | (2006.01) |
| G02B 27/12 | (2006.01) |
| G02B 27/14 | (2006.01) |

(52) U.S. Cl.
CPC .......... *G03B 21/2066* (2013.01); *G03B 21/208* (2013.01); *H04N 9/3152* (2013.01); *H04N 9/3161* (2013.01); *F21V 13/04* (2013.01); *G03B 21/2013* (2013.01); *G03B 21/2033* (2013.01); *G03B 33/12* (2013.01); *G02B 19/0057* (2013.01); *G02B 27/0994* (2013.01); *G02B 27/1026* (2013.01); *G02B 27/126* (2013.01); *G02B 27/141* (2013.01)

(58) Field of Classification Search
CPC ............... G03B 21/20; G03B 21/2013; G03B 21/2033; G03B 21/2066; G03B 21/208; H04N 9/31; H04N 9/3152; H04N 9/3161; H04N 9/3164; G02B 19/0057; G02B 27/14
USPC .................. 353/30–31, 85, 94; 362/230–231, 362/235–236; 359/641
See application file for complete search history.

(56) References Cited

U.S. PATENT DOCUMENTS

| | | | |
|---|---|---|---|
| 6,337,873 B1 | 1/2002 | Goering et al. | |
| 6,462,883 B1 * | 10/2002 | Wang et al. | 359/641 |
| 6,700,709 B1 * | 3/2004 | Fermann | 359/641 |
| 6,738,407 B2 * | 5/2004 | Hirano et al. | 372/69 |
| 6,840,634 B1 * | 1/2005 | Chang | 353/99 |
| 6,993,059 B2 * | 1/2006 | Anikitchev et al. | 372/106 |

(Continued)

FOREIGN PATENT DOCUMENTS

JP    2006-337923    12/2006

*Primary Examiner* — Jori S Reilly-Diakun
(74) *Attorney, Agent, or Firm* — Hamre, Schumann, Mueller & Larson, P.C.

(57) ABSTRACT

A light source apparatus comprises: a plurality of light sources that emit light having a wide spread angle at a fast axis and a narrow spread angle at a slow axis, a first refractive optical element that converts light emitted from the plurality of light sources at the fast axis to parallel light, and a second refractive optical element that converts the light emitted from the plurality of light sources at the slow axis to parallel light. The plurality of light sources are arranged along the fast axis.

6 Claims, 7 Drawing Sheets

(56) References Cited

U.S. PATENT DOCUMENTS

| | | | |
|---|---|---|---|
| 7,006,549 B2* | 2/2006 | Anikitchev et al. | 372/97 |
| 7,010,194 B2* | 3/2006 | Anikitchev et al. | 385/36 |
| 7,131,735 B2* | 11/2006 | Yokoyama | 353/98 |
| 7,221,694 B2* | 5/2007 | Hirano et al. | 372/75 |
| 7,680,170 B2* | 3/2010 | Hu et al. | 372/50.12 |
| 7,789,517 B2* | 9/2010 | Lee | 353/94 |
| 7,946,711 B2* | 5/2011 | Okuda et al. | 353/38 |
| 2006/0126690 A1* | 6/2006 | Kido et al. | 372/43.01 |

* cited by examiner

FIG. 4
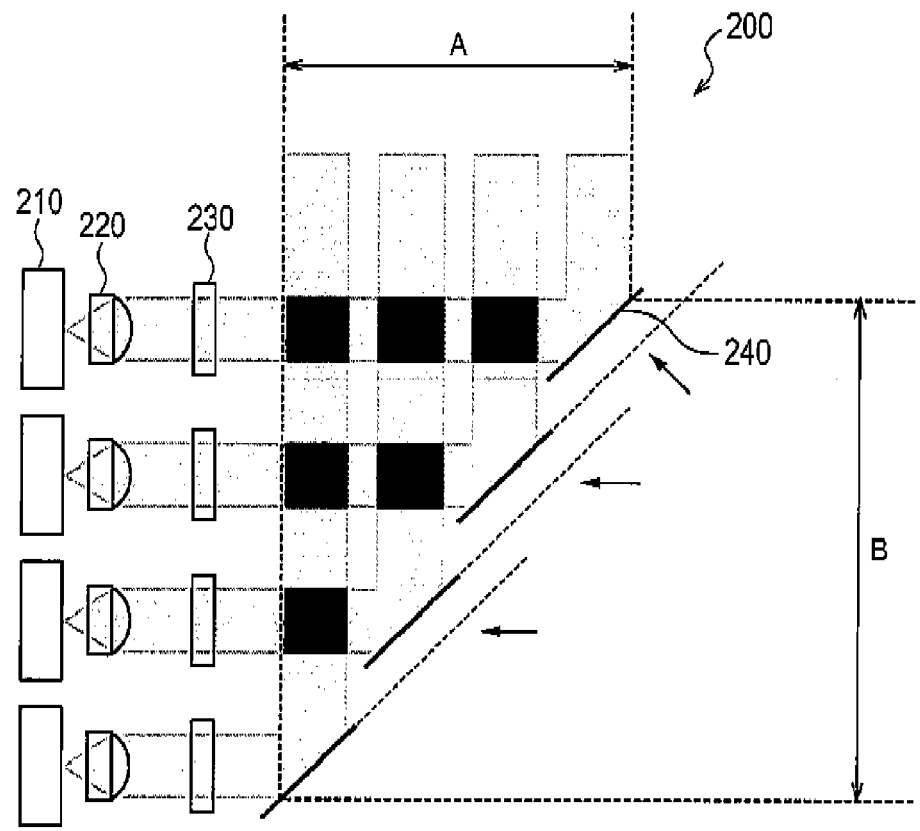
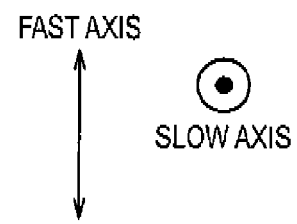

LASER LIGHT SOURCE AND PROJECTION DEVICE HAVING FIRST AND SECOND REFRACTIVE PARALLELIZING ELEMENTS

CROSS REFERENCE TO RELATED APPLICATIONS

This application is based upon and claims the benefit of priority from prior Japanese Patent Application No. 2011-279814, filed on Dec. 21, 2011; the entire contents of which are incorporated herein by reference.

BACKGROUND OF THE INVENTION

1. Field of the Invention

The present invention relates to a light source apparatus and a projection display apparatus provided with a plurality of light sources that emit light having a wide spread angle at a fast axis and a narrow spread angle at a slow axis.

2. Description of the Related Art

Conventionally, there has been known a light source (for example, LD: Laser Diode) that emits light having two axes (a fast axis and a slow axis). The light emitted from the light source has a wide spread angle at the fast axis and a narrow spread angle at the slow axis.

Further, it has been proposed to increase, by arranging the light sources in an array form, the amount of light emitted from a light source apparatus provided with a plurality of light sources. For example, in a light source apparatus, a plurality of light sources are arranged along a slow axis (for example, Japanese Unexamined Patent Application Publication No. 2006-337923).

However, in the aforementioned technology, etendue is not considered. Specifically, etendues at the slow axis is larger than etendue at the fast axis. As described above, when imbalance of the etendues at the two axes occurs, it becomes necessary to design an optical system provided at a rear stage of the light source in accordance with the size in an axial direction in which the etendue is larger. Therefore, an optical system with a small F number is required, resulting in an increase in the size of a lens or cost.

SUMMARY OF THE INVENTION

A light source apparatus according to a first feature comprises: a plurality of light sources (light sources 210) that emit light having a wide spread angle at a fast axis and a narrow spread angle at a slow axis, a first refractive optical element (first refractive optical element 220) that converts light emitted from the plurality of light sources at the fast axis to parallel light, and a second refractive optical element (second refractive optical element 230) that converts the light emitted from the plurality of light sources at the slow axis to parallel light. The plurality of light sources are arranged along the fast axis.

In the first feature, the number of light sources arranged along the fast axis is larger than the number of light sources arranged along the slow axis.

In the first feature, the light source apparatus further comprises: a mirror group (mirrors 240) that reflects the light, which is emitted from the plurality of light sources, toward a predetermined direction. The mirror group is arranged such that an interval of light fluxes emitted from the plurality of light sources at the fast axis is narrowed.

In the first feature, the mirror group is arranged such that each mirror is shifted in an optical axial direction of the light emitted from the plurality of light sources.

In the first feature, the light source apparatus further comprises: a plurality of light source units (light source unit 200P and light source unit 200Q). Each of the plurality of light source units comprises: the plurality of light sources; the first refractive optical element; the second refractive optical element; and the mirror group. The plurality of light source units are arranged to face each other.

A projection display apparatus according to a second feature comprises: the light source apparatus according to the first feature; an imager that modulates light emitted from the light source apparatus; and a projection unit that projects light emitted from the imager on a projection surface.

BRIEF DESCRIPTION OF THE DRAWINGS

FIG. 4 is a diagram illustrating a light source unit 200 according to the first embodiment.

DETAILED DESCRIPTION OF THE EMBODIMENTS

Hereinafter, a projection display apparatus according to embodiments of the present invention will be described with reference to the drawings. It is noted that in the following description of the drawings, identical or similar numerals are assigned to identical or similar parts.

It will be appreciated that the drawings are schematically shown and the ratio and the like of each dimension are different from the real ones. Accordingly, specific dimensions should be determined in consideration of the explanation below. Moreover, among the drawings, the respective dimensional relations or ratios may differ.

[Overview of First Embodiment]

A light source apparatus according to the embodiment comprises: a plurality of light sources that emit light having a wide spread angle at a fast axis and a narrow spread angle at a slow axis, a first refractive optical element that converts light emitted from the plurality of light sources at the fast axis to parallel light, and a second refractive optical element that converts the light emitted from the plurality of light sources at the slow axis to parallel light. The plurality of light sources are arranged along the fast axis.

In the embodiment, the plurality of light sources are arranged along at least the fast axis, paying attention with etendues at the fast axis and the slow axis. This addresses the imbalance of etendues at the fast axis and the slow axis. Consequently, this eliminates a need of using a lens with a small F number, resulting in improvement of use efficiency of light beams emitted from the plurality of light sources.

First Embodiment (Light Source)

Figure 1:
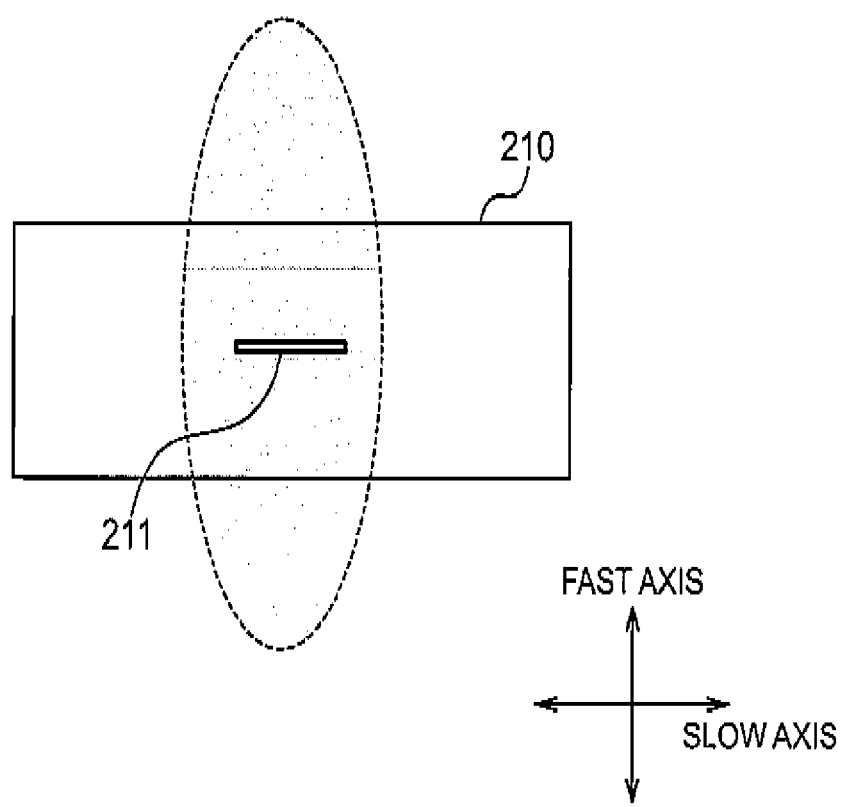
FIG. 1 is a diagram illustrating a light source 210 according to a first embodiment.

Hereinafter, a light source according to a first embodiment is explained. FIG. 1 is a diagram illustrating a light source 210 according to a first embodiment.

As illustrated in FIG. 1, the light source 210 has an emitter 211. The emitter 211 emits light having a spread angle at the fast axis, which is wider than a spread angle at the slow axis. In other words, the emitter 211 emits light having a spread angle at the slow axis, which is narrower than a spread angle at the fast axis. The emitter 211 has a width at the fast axis, which is narrower than a width at the slow axis. In other words, the emitter 211 has a width at the slow axis, which is wider than a width at the fast axis.

Etendue is generally expressed by $\pi \cdot A \sin^2\theta$, and is held in a conjugate relation. That is, etendue on an object plane is equal to etendue on an image plane. In the formula, A denotes an area of an emitter, and $\theta$ denotes a spread angle of light emitted from the emitter.

Furthermore, in order to consider the fast axis separately from the slow axis, when one-dimensional etendue is introduced, the one-dimensional etendue is expressed by $\sqrt{\pi} \cdot y \sin\theta$. Such one-dimensional etendue is also held in a conjugate relation. In the formula, y denotes a width of the emitter.

Hereinafter, in order to simplify explanation, sine is allowed to approximate to u, so that it is possible to derive the following relation (Equation 1) for the width y of the emitter and a spread angle u of light emitted from the emitter. The product of y and u is called a Lagrangian invariant, and is approximately held in a conjugate relation.

[Equation 1]

$$yl \times ul = yp \times up \qquad \text{(Equation 1)}$$

In Equation 1 above, the yl denotes the width of the emitter, the ul denotes the spread angle of the light emitted from the emitter, the yp denotes the width of an imager, and the up denotes a converging angle of light incident onto the imager.

For this relation, when considering the fast axis separately from the slow axis, Equation 1 may be expressed as follows.

Figure 2:
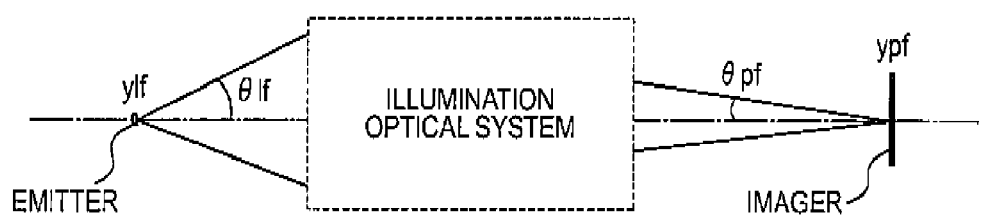
FIG. 2 is a diagram illustrating etendue at a fast axis according to the first embodiment.

For the fast axis, the following relation (Equation 2) is established as illustrated in FIG. 2.

[Equation 2]

$$ylf \times \theta lf = ypf \times \theta pf \qquad \text{(Equation 2)}$$

In Equation 2 above, the ylf denotes the width of the emitter at the fast axis, the $\theta lf$ denotes the spread angle of the light emitted from the emitter at the fast axis, the ypf denotes the width of the imager at the fast axis, and the $\theta pf$ denotes the converging angle of the light incident onto the imager at the fast axis.

Figure 3:
FIG. 3 is a diagram illustrating etendue at a slow axis according to the first embodiment.

For the slow axis, the following relation (Equation 3) is established as illustrated in FIG. 3.

[Equation 3]

$$yls \times \theta ls = yps \times \theta ps \qquad \text{(Equation 3)}$$

In Equation 3 above, the yls denotes the width of the emitter at the slow axis, the $\theta ls$ denotes the spread angle of the light emitted from the emitter at the slow axis, the yps denotes the width of the imager at the slow axis, and the $\theta ps$ denotes the converging angle of the light incident onto the imager at the slow axis.

Furthermore, when a general semiconductor laser is used as the light source 210, the etendue at the fast axis is significantly smaller than the etendue at the slow axis. That is, the following relation (Equation 4) is satisfied.

[Equation 4]

$$ylf \times \theta lf << yls \times \theta ls \qquad \text{(Equation 4)}$$

The ypf and the yps approximately are the same in order in size, and thus, when the light emitted from the light source 210 enters, with irradiation, onto the imager, the converging angle $\theta pf$ of the light incident onto the imager at the fast axis is, as is obvious from (Equation 2) to (Equation 4), significantly smaller than the converging angle $\theta ps$ of the light incident onto the imager at the slow axis. As described above, when the imbalance of the etendues at the fast axis and the slow axis occurs, in order to allow all of light beams emitted from the imager to be received in a projection lens, it is necessary to use a projection lens with a F number corresponding to the wide spread angle $\theta ls$. When the projection lens with the F number corresponding to the $\theta ls$ is used, the size of the projection lens becomes excessive with respect to the narrow spread angle $\theta lf$.

In order to solve such a problem, in the first embodiment, a plurality of light sources 210 are arranged along the fast axis. Specifically, the plurality of light sources 210 are arranged such that a relation of $N \times ylf \times \theta lf$ nearly equal to $yls \times \theta ls$ (N denotes the number of the light sources 210 arranged along the fast axis) is satisfied.

Alternatively, the number of the light sources 210 arranged along the fast axis is larger than the number of the light sources 210 arranged along the slow axis. Specifically, the plurality of light sources 210 are arranged such that a relation of $N \times ylf \times \theta lf$ nearly equal to $M \times yls \times \theta ls$ (N denotes the number of the light sources 210 arranged along the fast axis and M denotes the number of the light sources 210 arranged along the slow axis) is satisfied.

Consequently, the imbalance of the etendues at the fast axis and the slow axis is eliminated. That is, an increase in the size of the lens or cost is suppressed.

(Light Source Apparatus)

Hereinafter, a light source apparatus according to the first embodiment is explained. FIG. 4 is a diagram illustrating a light source unit 200 according to the first embodiment. In the first embodiment, a description will be provided for a case in which the light source apparatus includes one light source unit 200.

As illustrated in FIG. 4, the light source unit 200 includes a plurality of light sources 210, a plurality of first refractive optical elements 220, a plurality of second refractive optical elements 230, and a plurality of mirrors 240.

The plurality of light sources 210 are arranged along at least the fast axis. The plurality of light sources 210 may also be arranged along the slow axis. However, the number of the light sources 210 arranged along the fast axis is larger than the number of the light sources 210 arranged along the slow axis.

The plurality of first refractive optical elements 220 convert light beams emitted from the plurality of light sources 210 to parallel light at the fast axis. The plurality of first refractive optical elements 220 may be provided separately from one another, or may also be provided integrally with one another.

The plurality of second refractive optical elements 230 convert the light beams emitted from the plurality of light sources 210 to parallel light at the slow axis. The plurality of second refractive optical elements 230 may be provided separately from one another, or may also be provided integrally with one another.

The plurality of mirrors 240 configure a mirror group that reflects the light beams, which are emitted from the plurality of light sources 210, toward a predetermined direction. The plurality of mirrors 240 are arranged such that an interval of light fluxes emitted from the plurality of light sources 210 at the fast axis is narrowed. In other words, a width A (a width at the fast axis) of the light flux reflected by the plurality of mirrors 240 is narrower than a width B (a width at the fast axis) of the light flux emitted from the plurality of light sources 210. Specifically, the plurality of mirrors 240 are arranged so that each mirror 24 is shifted in an optical axial direction of the light emitted from the plurality of light sources 210.

In this way, the interval of the light flux emitted from the plurality of light sources 210 at the fast axis is narrowed, so that an increase in etendue at the fast axis is suppressed.

(Operation and Effect)

In the first embodiment, the plurality of light sources 210 are arranged along at least the fast axis, paying attention with the etendues at the fast axis and the slow axis. This addresses the imbalance of etendues at the fast axis and the slow axis. Consequently, this eliminates a need of using a lens with a large diameter, resulting in improvement of use efficiency of light beams emitted from the plurality of light sources 210.

In the first embodiment, the plurality of mirrors 240 are arranged such that an interval of light fluxes emitted from the plurality of light sources 210 at the fast axis is narrowed. In this way, an increase in the etendue at the fast axis is suppressed. That is, the arrangement of the plurality of mirrors 240 contributes to the solution of the imbalance of the etendue at the fast axis and the slow axis.

[First Modification]

Hereafter, a first modification of the first embodiment is explained. Mainly the differences from the first embodiment are described, below.

Figure 5:
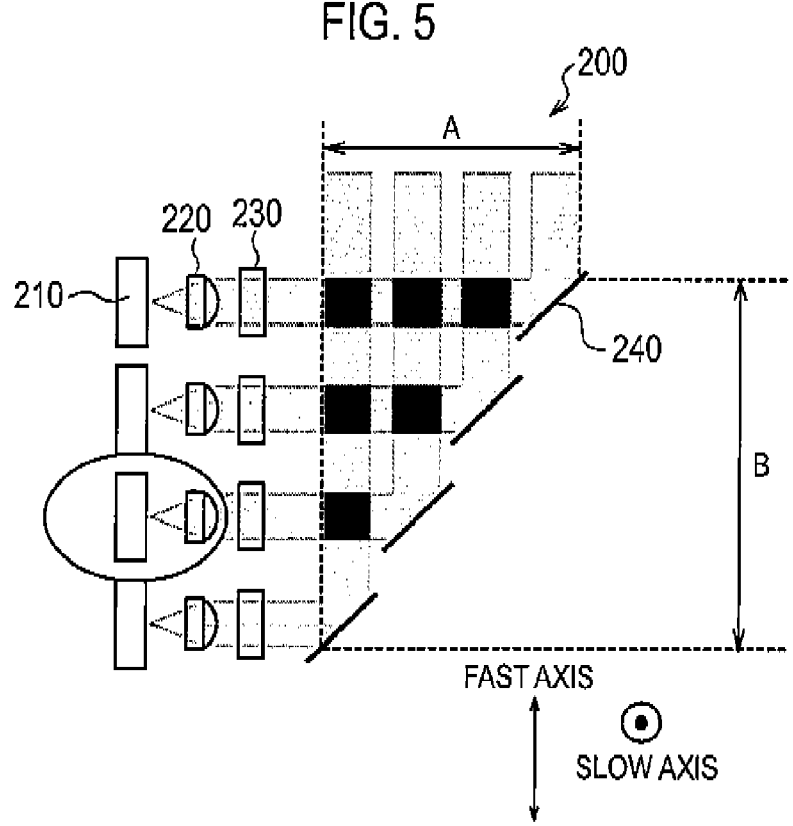
FIG. 5 is a diagram illustrating a light source unit 200 according to a first modification.
Figure 6:
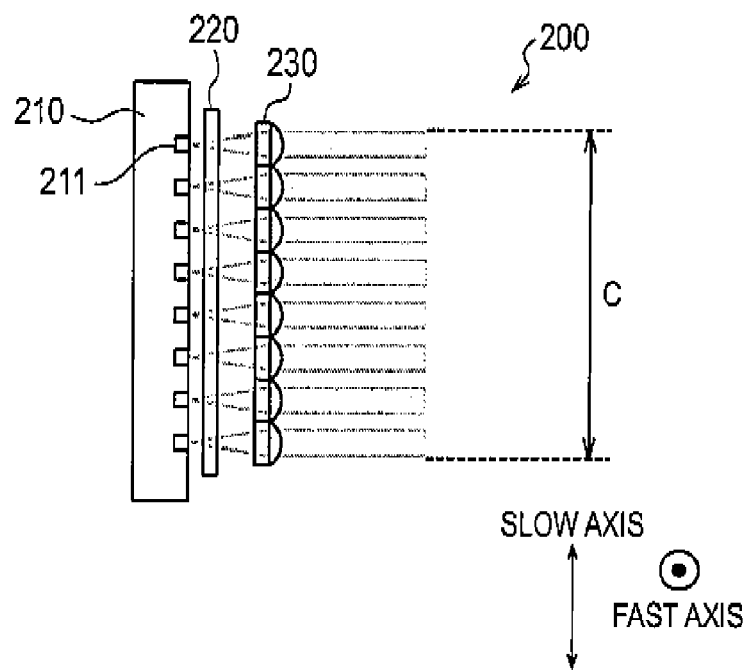
FIG. 6 is a diagram illustrating the light source unit 200 according to the first modification.

In the first modification, the light source unit 200 includes four light sources 210 along the fast axis as illustrated in FIG. 5. Meanwhile, each light source 210 is a bar-shaped semiconductor laser including eight emitters 211 along the slow axis as illustrated in FIG. 6. Furthermore, one light source 210 includes a plurality of emitters 211 along the slow axis.

In the first modification, the aforementioned first refractive optical elements 220 and second refractive optical elements 230 have a configuration (a lens array) in which lenses are provided integrally with one another at the slow axis to convert light emitted from each emitter 211 to parallel light. Furthermore, the first refractive optical elements 220 are provided at the side of the plurality of light sources 210 with respect to the second refractive optical elements 230.

In the first modification, a width A (a width at the fast axis) of the light flux reflected by the plurality of mirrors 240 is approximately equal to a width C (a width at the slow axis) of the light flux emitted, from the plurality of light sources 210. That is, the light emitted from the plurality of light sources 210 is adjusted such that the etendue at the fast axis coincides with the etendue at the slow axis.

[Second Modification]

A description will be given below of a second modification of the first embodiment. Mainly the differences from the first embodiment are described, below.

Figure 7:
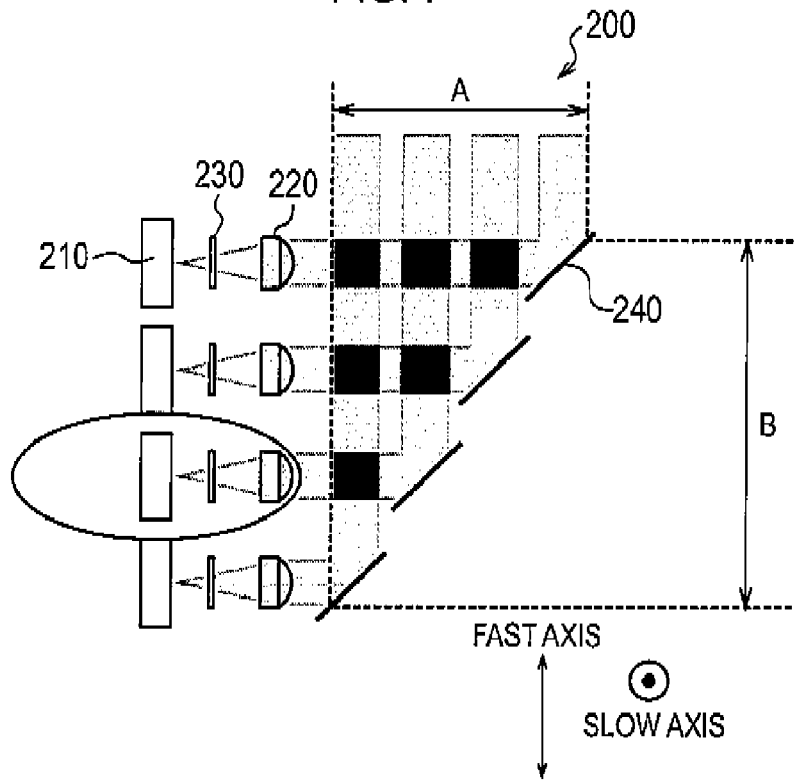
FIG. 7 is a diagram illustrating a light source unit 200 according to a second modification.
Figure 8:
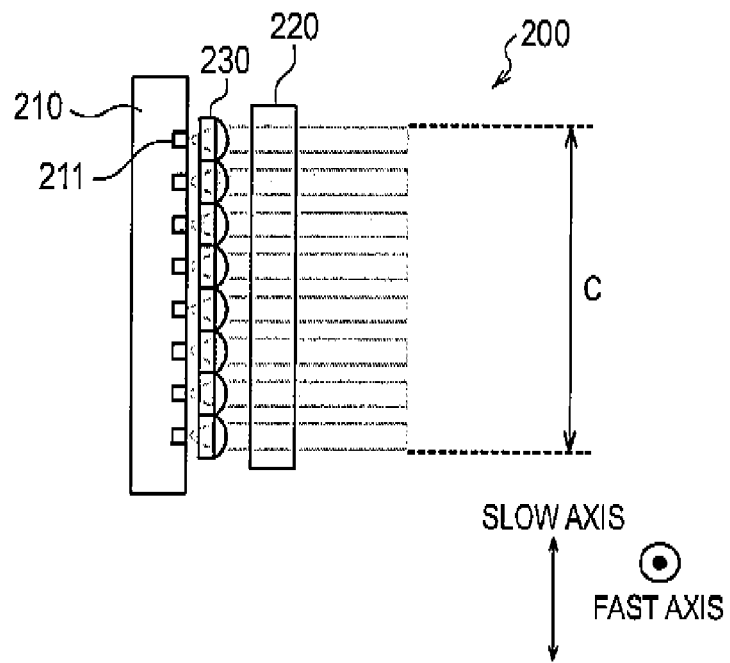
FIG. 8 is a diagram illustrating the light source unit 200 according to the second modification.

In the second modification, the light source unit 200 includes four light sources 210 along the fast axis as illustrated in FIG. 7. Meanwhile, each light source 210 includes eight emitters 211 along the slow axis as illustrated in FIG. 8.

Furthermore, one light source 210 includes a plurality of emitters 211 along the slow axis. In other words, the plurality of emitters 211 are provided on one heat sink.

In the second modification, the aforementioned first refractive optical elements 220 and second refractive optical elements 230 have a configuration (a lens array) in which lenses are provided integrally with one another at the slow axis to convert light emitted from each emitter 211 to parallel light. Furthermore, the second refractive optical elements 230 are provided at the side of the plurality of light sources 210 with respect to the first refractive optical elements 220.

In the second modification, a width A (a width at the fast axis) of the light flux reflected by the plurality of mirrors 240 is approximately equal to a width C (a width at the slow axis) of the light flux emitted from the plurality of light sources 210. That is, the light emitted from the plurality of light sources 210 is adjusted such that the etendue at the fast axis coincides with the etendue at the slow axis.

[Third Modification]

A description will be given below of a third modification of the first embodiment. Mainly the differences from the first embodiment are described, below.

Figure 9:
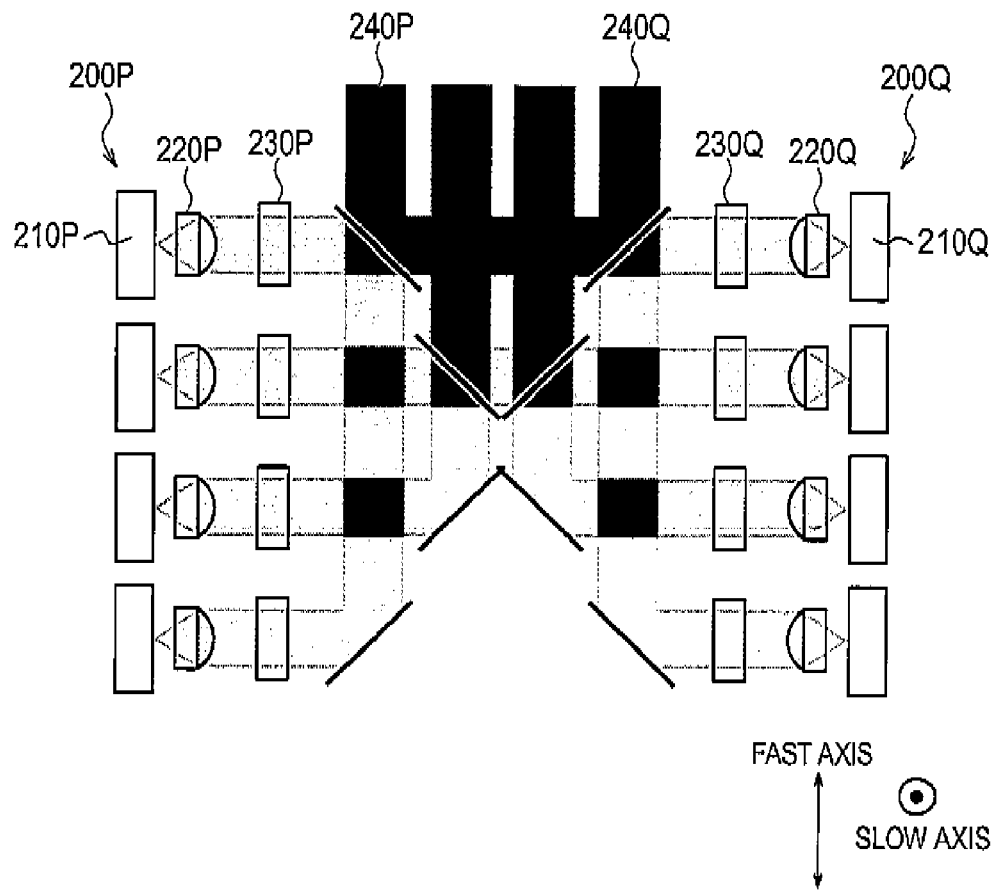
FIG. 9 is a diagram illustrating a light source apparatus according to a third modification.

In the third modification, a light source apparatus includes a plurality of light source units 200 (a light source unit 200P and a light source unit 200Q) as illustrated in FIG. 9.

The light source unit 200P includes a plurality of light sources 210P, a plurality of first refractive optical elements 220P, a plurality of second refractive optical elements 230P, and a plurality of mirrors 240P. The light source unit 200Q includes a plurality of light sources 210Q, a plurality of first refractive optical elements 220Q, a plurality of second refractive optical elements 230Q, and a plurality of mirrors 240Q.

Furthermore, the light source 210P and the light source 210Q have the same configuration as that of the light source 210. The first refractive optical element 220P and the first refractive optical element 220Q have the same configuration as that of the first refractive optical element 220. The second refractive optical element 230P and the second refractive optical element 230Q have the same configuration as that of the second refractive optical element 230. The mirror 240P and the mirror 240Q have the same configuration as that of the mirror 240.

Figure 10:
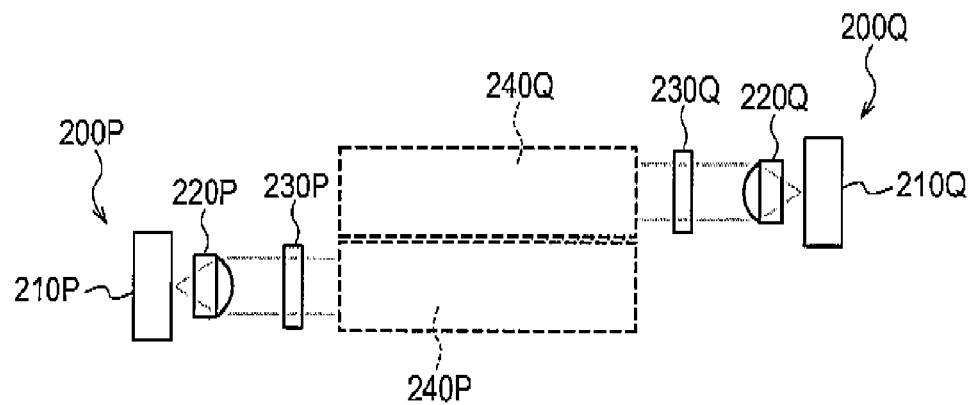
FIG. 10 is a diagram illustrating the light source apparatus according to the third modification.

In the third modification, the light source unit 200P and the light source unit 200Q are arranged to face each other as illustrated in FIG. 9. The light source unit 200P and the light source unit 200Q are arranged at shifted positions at the slow axis as illustrated in FIG. 10.

In the third modification, it is noted that an amount for narrowing a width of the light flux emitted from the plurality of light sources 210 at the fast axis is determined according to a width (an entire width) of the light flux emitted from the light source apparatus (the light source unit 200P and the light source unit 200Q) at the fast axis and the slow axis. That is, a shift amount of the plurality of mirrors 240 (the mirrors 240P and the mirrors 240Q) is determined according to the width (the entire width) of the light flux emitted from the light source apparatus (the light source unit 200P and the light source unit 200Q) at the fast axis and the slow axis.

[Fourth Modification]

A description will be given below of a fourth modification of the first embodiment. Mainly the differences from the first embodiment are described, below.

Figure 11:
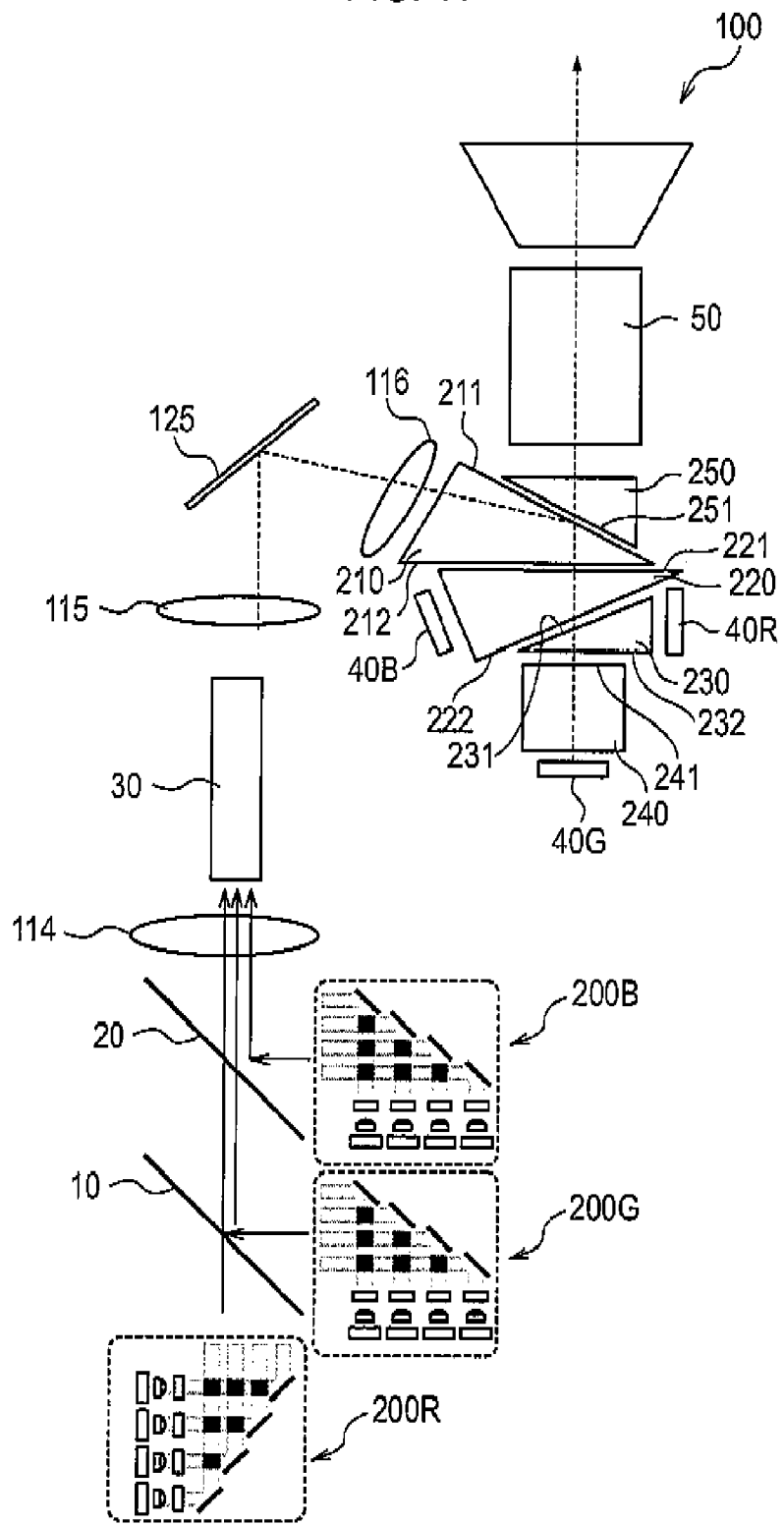
FIG. 11 is a diagram illustrating a projection display apparatus 100 according to the first embodiment.

In the fourth modification, a projection display apparatus using the aforementioned light source apparatus is explained. FIG. 11 is a diagram illustrating a projection display apparatus 100 according to the fourth modification. In addition, in the first embodiment, a description will be provided for the case of using red component light R, green component light G, and blue component light B as reference video light.

As illustrated in FIG. 11, firstly, the projection display apparatus 100 includes a plurality of light source units 200 (a light source unit 200R, a light source unit 200G, and a light source unit 200B), a dichroic mirror 10, a dichroic mirror 20, a rod integrator 30, a DMD 40, and a projection unit 50.

The light source unit 200R emits the red component light R. Similarly, the light source unit 200G emits the green component light G, and the light source unit 200B emits the blue component light B.

The dichroic mirror 10 transmits the red component light R and reflects the green component light G. The dichroic mirror 20 transmits the red component light R and the green component light G and reflects the blue component light B.

The rod integrator 30 is a solid rod including a transparent member such as glass. The rod integrator 30 uniformizes the light emitted from the light source unit 200. In addition, the rod integrator 30 may be a hollow rod in which an inner wall thereof includes a mirror surface.

The DMD 40 modulates the light emitted from the light source unit 200. Specifically, the DMD 40 includes a plurality of micromirrors, wherein the plurality of micromirrors are movable. Each micromirror is basically equivalent to one pixel. The DMD 40 switches whether to reflect light toward the projection unit 50 by changing an angle of each micromirror.

In the first embodiment, as the DMD 40, a DMD 40R, a DMD 40G, and a DMD 40B are provided. The DMD 40R modulates the red component light R on the basis of a red video signal R. The DMD 40G modulates the green component light G on the basis of a green video signal G. The DMD 40B modulates the blue component light B on the basis of a blue video signal B.

The projection unit 50 projects a video light modulated by the DMD 40 on the projection surface.

Secondly, the projection display apparatus 100 has desired lens group and mirror group. As the lens group, lenses 114 to 116 are provided, and as the mirror group, a mirror 125 is provided.

The lens 114 is a light condenser lens that condenses the light beams emitted from each of the light source units 200 on a light incident surface of the rod integrator 30. The lens 115 and the lens 116 are relay lenses that approximately focus the light emitted from the rod integrator 30 onto each DMD 40 as an image. The mirror 125 is a reflection mirror that reflects each color component light.

Thirdly, the projection display apparatus 100 has a desired prism group. As the prism group, a prism 210, a prism 220, a prism 230, a prism 240, and a prism 250 are provided.

The prism 210 is formed of a light transmitting member and has a surface 211 and a surface 212. Since an air gap is provided between the prism 210 (the surface 211) and the prism 250 (a surface 251) and an angle (an incident angle), at which light incident onto the prism 210 is incident onto the surface 211, is larger than a total reflection angle, the light incident onto the prism 210 is reflected by the surface 211. Meanwhile, since an air gap is provided between the prism 210 (the surface 212) and the prism 220 (a surface 221), but an angle (an incident angle), at which the light reflected by the surface 211 is incident onto the surface 212, is smaller than the total reflection angle, the light reflected by the surface 211 passes through the surface 212.

The prism 220 is formed of a light transmitting member and has a surface 221 and a surface 222. Since an air gap is provided between the prism 210 (the surface 212) and the prism 220 (the surface 221) and an angle (an incident angle), at which blue component light B initially reflected by the surface 222 and blue component light B emitted from the DMD 40B are incident onto the surface 211, is larger than the total reflection angle, the blue component light B initially reflected by the surface 222 and the blue component light B emitted from the DMD 40B are reflected by the surface 221. Meanwhile, since an angle (an incident angle), at which the blue component light B reflected by the surface 221 and then reflected by the surface 222 at the second time is incident onto the surface 211, is smaller than the total reflection angle, the blue component light B reflected by the surface 221 and then reflected by the surface 222 at the second time passes through the surface 221.

The surface 222 is a dichroic mirror surface that transmits the red component light R and the green component light G, and reflects the blue component light B. Accordingly, among the light beams reflected by the surface 211, the red component light R and the green component light G pass through the surface 222, and the blue component light B is reflected by the surface 222. The blue component light B reflected by the surface 221 is reflected by the surface 222.

The prism 230 is formed of a light transmitting member and has a surface 231 and a surface 232. Since an air gap is provided between the prism 220 (the surface 222) and the prism 230 (the surface 231) and an angle (an incident angle), at which red component light R reflected by the surface 232 by passing through the surface 231 and red component light R emitted from the DMD 40R are incident onto the surface 231 again, is larger than the total reflection angle, the red component light R reflected by the surface 232 by passing through the surface 231 and the red component light R emitted from the DMD 40R are reflected by the surface 231. Meanwhile, since an angle (an incident angle), at which the red component light R reflected by the surface 232 after being emitted from the DMD 40R and reflected by the surface 231 is incident onto the surface 231 again, is smaller than the total reflection angle, the red component light R reflected by the surface 232 after being emitted from the DMD 40R and reflected by the surface 231 passes through the surface 231.

The surface 232 is a dichroic mirror surface that transmits the green component light G, and reflects the red component light R. Accordingly, among the light beams having passed through the surface 231, the green component light G passes through the surface 232, and the red component light R is reflected by the surface 232. The red component light R reflected by the surface 231 is reflected by the surface 232. The green component light emitted from the DMD 40G passes through the surface 232.

The prism 240 is formed of a light transmitting member and has a surface 241. The surface 241 is configured to transmit the green component light G. In addition, the green component light G incident onto the DMD 40G and the green component light G emitted from the DMD 40G pass through the surface 241.

The prism 250 is formed of a light transmitting member and has a surface 251.

In other words, the blue component light B is reflected by the surface 211 (1), is reflected by the surface 222 (2), is reflected by the surface 221 (3), is reflected by the DMD 40B (4), is reflected by the surface 221 (5), is reflected by the surface 222 (6), and passes through the surface 221 and the surface 251 (7). In this way, the blue component light B is modulated by the DMD 40B and is guided to the projection unit 50.

The red component light B is reflected by the surface 211 (1), is reflected by the surface 232 after passing through the surface 212, the surface 221, the surface 222, and the surface 231 (2), is reflected by the surface 231 (3), is reflected by the DMD 40R (4), is reflected by the surface 231 (5), is reflected by the surface 232 (6), and passes through the surface 231, the surface 232, the surface 221, the surface 212, the surface 211, and the surface 251 (7). In this way, the red component light R is modulated by the DMD 40R and is guided to the projection unit 50.

The green component light G is reflected by the surface 211 (1), is reflected by the DMD 40G after passing through the surface 212, the surface 221, the surface 222, the surface 231, the surface 232, and the surface 241 (2), and passes through the surface 241, the surface 232, the surface 231, the surface 222, the surface 221, the surface 212, the surface 211, and the surface 251 (3). In this way, the green component light G is modulated by the DMD 40G and is guided to the projection unit 50.

Other Embodiments

The present invention is explained through the above embodiment, but it must not be understood that this invention is limited by the statements and the drawings constituting a part of this disclosure. From this disclosure, various alternative embodiments, examples, and operational technologies will become apparent to those skilled in the art.

In the embodiment, three DMDs are exemplified as the imager. However, the embodiment is not limited thereto. For example, the imager may be one DMD. Alternatively, the imager may be one liquid crystal panel or three liquid crystal panels (a red liquid crystal panel, a green liquid crystal panel, and a blue liquid crystal panel). The liquid crystal panel may be a transmissive liquid crystal panel or a reflective liquid crystal panel.

In the embodiment, the plurality of mirrors 240 configure an adjustment unit that adjusts light beams emitted from the plurality of light sources 210 such that that the etendue at the fast axis coincides with the etendue at the slow axis. However, the embodiment is not limited thereto. Specifically, the plurality of light sources 210 provided in the light source apparatus may be arranged such that the widths (entire widths) of the light fluxes emitted from the light source apparatus at the fast axis and the slow axis coincide with each other. In such a case, the plurality of mirrors 240 may not be always shifted. That is, the adjustment unit, which is configured to adjust the light beams emitted from the plurality of light sources 210 such that the etendue at the fast axis coincides with the etendue at the slow axis, is configured by the arrangement of the plurality of mirrors 240.

What is claimed is:

1. A light source apparatus comprising:
    a plurality of light sources that emit light having a wide spread angle at a fast axis and a narrow spread angle at a slow axis,
    a first refractive optical element that converts light emitted from the plurality of light sources at the fast axis to parallel light,
    a second refractive optical element that converts the light emitted from the plurality of light sources at the slow axis to parallel light, and
    a mirror group that includes a plurality of mirrors, the plurality of mirrors reflecting the light emitted from the plurality of light sources in a same direction so that light beams of the light emitted from the plurality of light sources are parallel with each other, wherein
    the plurality of light sources are arranged along the fast axis, and
    the mirror group is arranged such that an interval between the light beams of the light emitted from the plurality of light sources at the fast axis is narrowed.

2. The light source apparatus according to claim 1, wherein a number of the light sources arranged along the fast axis is larger than a number of the light sources arranged along the slow axis.

3. The light source apparatus according to claim 1, wherein the mirror group is arranged such that each of the plurality of mirrors is shifted in an optical axial direction of the light emitted from the plurality of light sources relative to a neighboring one of the plurality of mirrors.

4. The light source apparatus according to claim 1, further comprising: a plurality of light source units, wherein
    each of the plurality of light source units comprises: the plurality of light sources; the first refractive optical element; the second refractive optical element; and the mirror group, and
    the plurality of light source units are arranged to face each other.

5. A projection display apparatus comprising: the light source apparatus according to claim 1; an imager that modulates light emitted from the light source apparatus; and a projection unit that projects light emitted from the imager on a projection surface.

6. The light source apparatus according to claim 1, wherein the mirror group is arranged such that each mirror is respectively placed more than one plane which are parallel with each other.

* * * * *